United States Patent

[11] 3,580,079

| [72] | Inventors | Nelson A. Crites;<br>Donald H. Lyons, Columbus, Ohio |
|---|---|---|
| [21] | Appl. No. | 804,878 |
| [22] | Filed | Mar. 6, 1969 |
| [45] | Patented | May 25, 1971 |
| [73] | Assignee | Abbott Laboratories<br>North Chicago, Ill. |

[54] THERMOMETER INDICATOR
9 Claims, 8 Drawing Figs.

[52] U.S. Cl............................................. 73/358,
116/114.5, 350/160, 350/267, 350/312
[51] Int. Cl............................................G01k 11/06,
G02b 5/24
[50] Field of Search........................................ 73/356,
358; 116/114.5; 350/160 (P), 267, 291, 312

[56] References Cited
UNITED STATES PATENTS

| 2,612,078 | 9/1952 | Delisio | 350/312 |
| 2,783,682 | 3/1957 | Swenson | 350/312X |
| 3,175,401 | 3/1965 | Geldmacher | 73/358 |
| 3,430,491 | 3/1969 | Gignilliat | 73/358 |
| 3,465,590 | 9/1969 | Kluth et al. | 73/356 |

*Primary Examiner*—Louis R. Prince
*Assistant Examiner*—Frederick Shoon
*Attorney*—Robert L. Niblack ABSTRACT: A disposable clinical thermometer contains a temperature responsive material within a cell having a viewing window. The window is made translucent by abrading or roughening its inner surface to diffuse light passing therethrough. When a predetermined temperature is reached, the material melts, spreads over and wets the roughened surface to optically smooth it, thereby making it transparent. Indicia of temperature, previously obscured by the translucent window and the solid state temperature responsive material then becomes visible to one reading the thermometer.

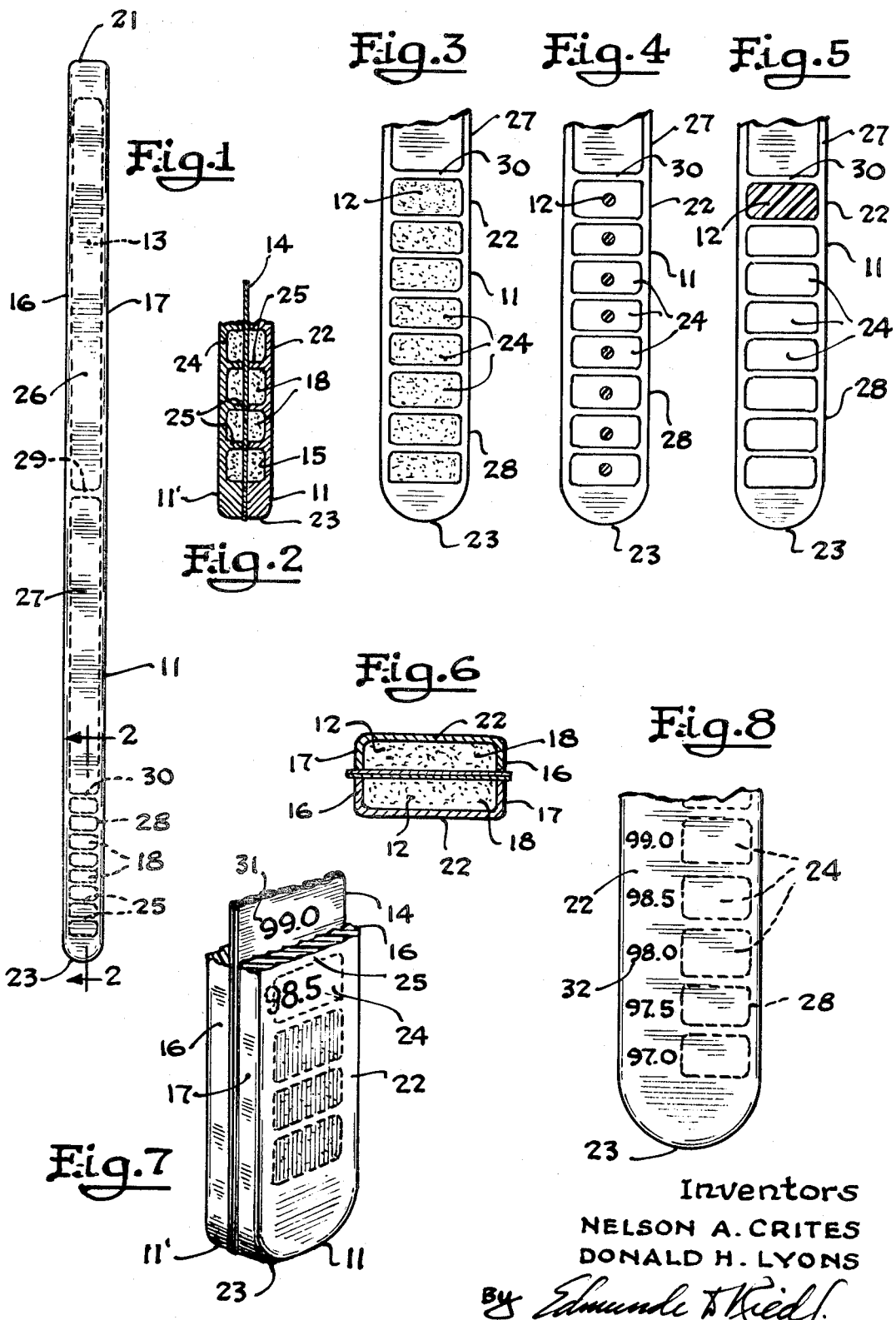

THERMOMETER INDICATOR

DISCLOSURE

This invention relates to temperature measurement. More particularly, this invention relates to disposable thermometers, and especially to thermometers suitable for taking the temperature of the human body.

When diagnosing a patient's complaint, a measurement of body temperature is routinely taken to detect any deviation from the normal temperature range that may aid in the diagnosis. Similarly, the temperature of hospitalized patients is regularly taken and recorded to chart their condition and also to indicate their response to medication.

The presently used mercury capillary thermometers are far too expensive to justify their disposal after a single use. Yet, being used repeatedly, they introduce the necessity of sterilization after use to prevent communication of disease between patients. In addition to the problem of keeping them clean, they are difficult to read and can easily be broken. Furthermore, being relatively expensive, they introduce problems of inventory control.

The primary purpose of this invention then is to provide an inexpensive disposable thermometer that can be individually packaged free from contamination, that is accurate, easily read, and suitable either for oral or rectal use.

In certain of its broader aspects, the new thermometer of this invention comprises a probe of a shape suitable for a least partial insertion of its distal portion into a body cavity in the same manner as the presently used mercury capillary thermometers. At the proximal portion of the probe is a handle means for manipulating it into a proper position for temperature measurement, and for holding it during removal and reading. At the distal portion of the probe is a cell that houses temperature responsive material that shall be completely described later. This temperature responsive material has a known and predetermined melting point and is chosen to undergo the phase change from solid to liquid sharply at the desired temperature.

Those devices available in the prior art that depend on the phase change of a material to measure bodily temperature have in practice been difficult to use. They either are too bulky for comfortable insertion into the body cavity of choice, or are difficult to read once a temperature has been taken leading to inaccurate readings.

The present invention overcomes these difficulties by providing the cell with a viewing window made from a material that is transparent to light transmission. At least part of the interior surface of this window is, however, sufficiently roughened so that light passing through the window is scattered. Thus, the translucent condition of the window together with the opacity supplied by the presence of the temperature responsive material in its solid phase obscures any view through the window. When exposed to a predetermined elevated temperature, the temperature responsive material changes from the solid to the liquid phase. In the liquid phase, it spreads over and optically smooths the roughened inside surface of the viewing window so that a transparent condition exists and indicia of temperature, previously obscured, can now clearly be seen through the viewing window. The term "optically smooths" is used herein to denote the condition where liquid fills the cavities of an irregular surface so that it becomes smooth and transmits light without distortion, that is, in straight lines. The indicia of temperature can either be numerals or a distinctively colored background to indicate temperature. For example, a green background can be used to indicate a temperature in the normal range (<98.6° F.), and a red background to indicate a feverish condition, (>98.6° F.).

Additional objects, advantages and functions of this invention will become apparent upon reference to this specification and to the attached drawing illustrating the preferred embodiment of this invention, in which like elements are identified by like reference numerals in each of the views, and in which:

FIG. 1 is a top plan view of a half shell of the thermometer housing which when combined with another half shell of like construction comprises the thermometer assembly;

FIG. 2 is a view along 2-2 of FIG. 1 showing two half shells assembled, being spaced by an intermediate plate;

FIG. 3 is an enlarged plan view of the distal portion of the thermometer illustrating one manner of the distal portion of the thermometer illustrating one manner of disposing the temperature responsive material within the cell;

FIG. 4 is a view similar to FIG. 3 illustrating another disposition of the temperature responsive material within the cell;

FIG. 5 is a view similar to FIG. 3 illustrating still another disposition of the temperature responsive material within the cell;

FIG. 6 is a lateral cross-sectional view of one cell such as shown in FIG. 2;

FIG. 7 is an isometric view of the distal portion of the thermometer showing two half shells spaced by an intermediate plate bearing indicia of temperature and the view of one such indicium through the viewing window; and FIG. 8 is a plan view of the thermometer illustrating an embodiment wherein the indicia of temperature are located alongside the cells of the shell body rather than upon the intermediate plate.

Referring to the drawings and particularly FIG. 1, there is shown a half shell 11 that when combined with another half shell 11' (not shown) comprises the housing of the thermometer. Shell 11 is shown approximately 1½ times the size of the preferred embodiment.

The absolute size of the thermometer is dictated only by the necessity for comfortable insertion into body openings, for instance the mouths of infants and legibility of temperature readings. Shell 11 can be constructed from any nontoxic substance that is sufficiently rigid so that it can withstand insertion into body cavities, yet is not so brittle that it might snap apart if it were inadvertently bit upon, for example. Preferably a plastic material, such as an acrylic resin, that can be formed by injection molding is used. Since, as will be seen, a portion of shell 11 must be transparent to light transmission, the acrylics are especially suitable.

Shell 11, in the preferred embodiment, is an elongated probe having a rounded distal end 23 to ease insertion during operation, and blunted proximal end 21. Trough 13 occupies the central portion of shell 11, and is defined by ends 21, 23, sidewalls 16, 17 and bottomwall 22 (not shown). Trough 13 is longitudinally divided into three sections 26, 27 and 28. Section 26 extends from end 21 to lateral wall 29; section 27 from wall 29 to lateral wall 30; and section 28 from wall 30 to end 23.

Sections 26 and 27 of trough 13 are present to conserve material from which shell 11 is constructed and also provide for a shell lighter in weight and more flexible. Lateral wall 29 provides additional structural strength and support for intermediate plate 14 (not shown). Sections 26 and 27 occupy that part of shell 11 that after final assembly is the handle portion of the thermometer.

Section 28 of trough 13 houses the temperature responsive material 12. This material is a substance chosen to change from the solid phase to the liquid phase at a predetermined temperature. It can either be a pure material or a mixture of materials selected to have the desired eutectic point. There are many substances known in the art that have sharp melting points that immediately are suggested for use as a temperature responsive material and examples are given in U.S. Pat. No. 3,002,385. Especially suitable are capric acid and lauric acid together with mixtures of these acids that have the desired melting point.

Referring now particularly to FIGS. 1 and 2, the temperature responsive material 12 is disposed in section 28 of trough 13 so that it at least partially covers the inside surface 15 of the viewing window 24 in bottomwall 22.

The view through window 24 is not only obscured by the presence of the opaque solid temperature responsive material 12 on surface 15, but also because window 24, otherwise transparent to light transmission, has been rendered translucent by the roughened condition of surface 15. Surface 15 has a multitude of irregularities on its surface that diffuse or scatter light passing through window 24.

Preferably this surface roughness of surface 15 is accomplished by having that portion of the mold that corresponds to surface 15 roughened to impart the surface irregularity during the molding of shell 11.

Another, although less desirable method of imparting surface irregularity to surface 15 is direct machining of the surface. This method can introduce undesirable residues from the machining into material 12, and thus unpredictably alter the melting point of material 12 from the expected predetermined value.

The degree of roughness applied to surface 15 necessary for the operation of this invention is sufficient when, without any material 12 present, light transmitted through window 24 is sufficiently diffused so that temperature indicium present on plate 14 is not legible or plate 14 itself is not visible when viewed through window 24. The preferred degree of roughness as measured on a glass surface with a profilometer when the distance from surface 15 to plate 14 is 0.030 inch is a Root-Mean-Square value of 150 millionths inch/inch. At this value any indicium on plate 14 will just be obscured, depending on the visual acuity of the observer and the indicium on plate 14. At RMS values of 250 millionths inch/inch the diffusion is complete and the view through window 14 is obscured.

Since the desideratum is that visibility be just obscured and translucence is a function of distance between surface 15 and plate 14 and also of surface roughness, some experimentation is necessary for various materials and distances. Generally as the distance between surface 15 and plate 14 increases, visibility decreases and of course as roughness increases visibility also decreases. After surface 15 has been rendered sufficiently translucent so that plate 14 or indicium thereon is obscured increases in roughness have little value.

In the preferred embodiment, section 28 of trough 13 is divided into a plurality of cells 18 that are separated by lateral walls 25. In each cell 18 is disposed a temperature responsive material 12 that has a melting point selected to correspond with an indicium on plate 14, such for example indicium 31 in FIG. 7.

After material 12 has been disposed in section 28, or in each cell 18 in the preferred embodiment of shell 11, the thermometer is ready for assembly.

A second shell 11' similarly having material 12 disposed in cells 18 is mated to shell 11 along the upper surfaces of ends 21, 23, lateral walls 25, 29, 30 and sidewalls 16, 17 as shown in FIGS. 2, 6 and 7. These upper surfaces sealingly engage plate 14 which comprises a plastic or paper strip, and spaces shells 11, 11'. A suitable adhesive is an epoxy resin, but any nontoxic adhesive that will hold the shells in sealing engagement spaced by plate 14 is satisfactory.

During operation, the distal end of the thermometer assembly is inserted into a body cavity. The temperature of the body cavity is indicated by melting material 12 in those cells 18 containing a material 12 that melts below or at the temperature of the body cavity. As material 12 melts, it optically smooths surface 15 filling in the irregularities of the surface so that light is transmitted in straight lines through window 24, as shown in FIG. 7, and some indicium of temperature, for example a number imprinted on plate 14, becomes legible when viewed through window 24. When the thermometer is removed for reading, the highest indicated temperature legible is regarded as the temperature of the body.

The embodiments shown in FIGS. 2, 3 and 6 have cells 18 filled with material 12. Sometimes a meniscus of melted material 12 or an air bubble entrapped in melted material 12 will make reading difficult. This especially true is when the indicia of temperature 31 are small or cells 18 are themselves small. If this proves a difficulty, the alternative embodiments shown in FIGS. 4 and 5 are especially useful.

In the embodiment shown in FIG. 4, only a dot of material 12 is placed on surface 18. In the embodiment of FIG. 5 a thin film of material 12 is deposited on surface 15. In each embodiment, the amount of material 12 is preferably only enough to optically smooth surface 15 when material 12 melts in response to temperature.

Although in the preferred embodiment the indicia of temperature is imprinted on plate 14, it is equally suitable, as shown in FIG. 8, to have a colored or other suitable background on plate 14. A numerical FIGURE 32 is imprinted on bottom wall 22 adjacent or alongside the cell 18 having disposed therein a temperature responsive material 12 having a melting point corresponding to the imprinted numerals.

Further, the indicia of temperature on plate 14 can also be a colored or other distinctive background.

We claim:

1. A thermometer for measuring body temperature comprising a member for insertion into a body cavity and having a distal portion and a proximal portion; a handle means in the proximal portion for manipulating the member; an anterior wall and a posterior wall in the distal portion spaced-apart from each other to define within the member a cell; a window in the member for providing a view of the interior of the cell spaced apart from an indicium of temperature within said cell; a temperature responsive material positioned within said cell between the interior surface of the window and the indicium of temperature; the interior surface of the window having a roughened surface for diffusing light transmitted through the window; the temperature responsive material when in the solid phase cooperating with the roughened surface of the window to render the view therethrough translucent, and when in the liquid phase having an index of refraction substantially equal to that of the window whereby said liquid wets the interior surface of viewing window to optically smooth the roughened surface and restore transparency.

2. A thermometer according to claim 1 in which the roughness of said window is equivalent to the roughness on a glass surface of a Root-Mean-Square value of greater than 150 millionths of an inch/inch.

3. A thermometer according to claim 1 in which said temperature responsive material is selected from the group consisting of capric acid, lauric acid, the methyl esters of capric and lauric acids and mixtures thereof.

4. A thermometer according to claim 1 in which the temperature responsive material fills the cell.

5. A thermometer according to claim 1 in which the temperature responsive material is deposited as a film upon the interior surface of the window.

6. A thermometer according to claim 1 in which the temperature responsive material in the solid phase is affixed to only a portion of the interior surface of the window.

7. A thermometer comprising a pair of shells each having a distal portion and a proximal portion; a central trough in the distal portion having a base transparent but for the roughened inner surface of the base which diffuses light passing therethrough; a temperature responsive material disposed on the base so that in the solid phase it cooperates with the roughened surface to obscure the view through the otherwise transparent base, and in the liquid phase has an index of refraction substantially equal to that of the base, whereby the liquid optically smooths the roughened inner surface to render the base transparent; said shells in sealing engagement and spaced by a plate having an indicium of temperature on the face thereof.

8. A thermometer according to claim 7 in which the roughness of said inner surface of the base is equivalent to the roughness on a glass surface of a Root-Mean-Square value of greater than 150 millionths of an inch/inch.

9. A thermometer according to claim 7 in which said trough comprises a plurality of compartments each having a temperature responsive material disposed therein selected to melt at a different predetermined temperature; and indicia of temperature on the plate aligned with said compartments and corresponding to the melting point of the temperature responsive material in said compartment so that when the material melts, the corresponding indicium of temperature becomes visible when viewed through the outer surface of the base.